US012737496B2

(12) United States Patent
Bae

(10) Patent No.: US 12,737,496 B2
(45) Date of Patent: Sep. 15, 2026

(54) ARTIFICIAL INTELLIGENCE BASED SERVICE PROVIDING METHOD WITHOUT LEAKING PRIVATE INFORMATION AND CLIENT APPARATUS

(71) Applicant: Cubig Corp., Seoul (KR)

(72) Inventor: Ho Bae, Seoul (KR)

(73) Assignee: CUBIG CORP., Seoul (KR)

( * ) Notice: Subject to any disclaimer, the term of this patent is extended or adjusted under 35 U.S.C. 154(b) by 72 days.

(21) Appl. No.: 18/908,054

(22) Filed: Oct. 7, 2024

(65) Prior Publication Data

US 2025/0117517 A1 Apr. 10, 2025

(30) Foreign Application Priority Data

Oct. 6, 2023 (KR) ........................ 10-2023-0133086

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC ......................... G06F 21/6245; G06F 21/6227
USPC ........................................................... 726/27
See application file for complete search history.

(56) References Cited

U.S. PATENT DOCUMENTS 7,243,097 B1 * 7/2007 Agrawal ............. G06F 16/2452
11,409,754 B2 * 8/2022 Domeniconi ......... G06F 16/313
12,210,640 B1 * 1/2025 Bin ..................... G06F 21/6245
2016/0019816 A1 * 1/2016 Parry ....................... G09B 5/06 704/2
2017/0116436 A1 * 4/2017 Wu ........................ H04W 12/02
2019/0214060 A1 * 7/2019 Goel ..................... H04W 12/61
2021/0160230 A1 * 5/2021 Du .......................... G06F 21/32
2021/0209304 A1 * 7/2021 Yang ..................... G06F 40/295
2021/0279367 A1 * 9/2021 Khan .................... G06F 21/577
2021/0326537 A1 * 10/2021 Liu ..................... G06F 21/6245

(Continued)

FOREIGN PATENT DOCUMENTS

CN 116346310 A 6/2023
KR 10-2021-0118429 A 9/2021
KR 10-2023-0086536 A 6/2023

OTHER PUBLICATIONS

Korean Office Action for related KR Application No. 10-2023-0133086 mailed Jul. 26, 2024 from Korean Intellectual Property Office.

*Primary Examiner* — Dant B Shaifer Harriman
(74) *Attorney, Agent, or Firm* — Paratus Law Group, PLLC

(57) ABSTRACT

Provided is a method of providing an artificial intelligence (AI)-based service without exposure of personal information, which includes receiving, by a client apparatus, a user query, performing, by the client apparatus, preprocessing on the user query to replace a target word corresponding to personal information in the user query with a corresponding replacement word, transmitting, by the client apparatus, the preprocessed user query to a service server for providing an AI-based service, and replacing, by the client apparatus, the replacement word in an answer corresponding to the user query that is received from the service server with the target word corresponding thereto.

7 Claims, 3 Drawing Sheets

(56) References Cited

U.S. PATENT DOCUMENTS

| | | | | |
|---|---|---|---|---|
| 2023/0276229 | A1* | 8/2023 | Todasco | H04W 12/02 726/30 |
| 2024/0037326 | A1* | 2/2024 | Vargas | G06F 16/3347 |
| 2024/0214332 | A1* | 6/2024 | Yu | G06F 16/2428 |
| 2025/0117517 | A1* | 4/2025 | Bae | G06F 21/6245 |
| 2025/0278420 | A1* | 9/2025 | Lala | G06F 16/3344 |
| 2025/0390603 | A1* | 12/2025 | Kamyshenko | G06F 21/6245 |

* cited by examiner

CLIENT APPARATUS

300

STORAGE DEVICE (310)

INTERFACE DEVICE (340)

MEMORY (320)

COMMUNICATION DEVICE (350)

COMPUTATION DEVICE (330)

OUTPUT DEVICE (360)

ARTIFICIAL INTELLIGENCE BASED SERVICE PROVIDING METHOD WITHOUT LEAKING PRIVATE INFORMATION AND CLIENT APPARATUS

CROSS-REFERENCE TO RELATED APPLICATION

This application claims priority to and the benefit of Korean Patent Application No. 10-2023-0133086, filed on Oct. 6, 2023, the disclosure of which is incorporated herein by reference in its entirety.

BACKGROUND

The technology described below relates to a technique of providing an artificial intelligence-based service.

Recently, various hyperscale artificial intelligence (AI) models have been developed. For example, hyperscale AI models are linked to search engines to receive queries input by individual users and process the queries. The content input by the user may include personal information or sensitive information. In this case, the personal information or sensitive information is transmitted to the server, which poses a risk of information exposure.

SUMMARY

In one general aspect, there is provided a method of providing an artificial intelligence (AI)-based service without exposure of personal information, which includes receiving, by a client apparatus, a user query, performing, by the client apparatus, preprocessing on the user query to replace a target word corresponding to personal information in the user query with a corresponding replacement word, transmitting, by the client apparatus, the preprocessed user query to a service server for providing an AI-based service, and replacing, by the client apparatus, the replacement word in an answer corresponding to the user query that is received from the service server with the target word corresponding thereto.

In another aspect, there is provided a client apparatus for receiving an artificial intelligence (AI)-based service, which includes an interface device that receives a user query, a communication device that transmits a preprocessed user query, and receives an answer, which is an AI-based service result for the preprocessed user query, and a computation device that performs preprocessing on the user query to replace a target word corresponding to personal information in the received user query with a replacement word and replaces the replacement word with the target word corresponding thereto in the answer.

DETAILED DESCRIPTION

Figure 1:
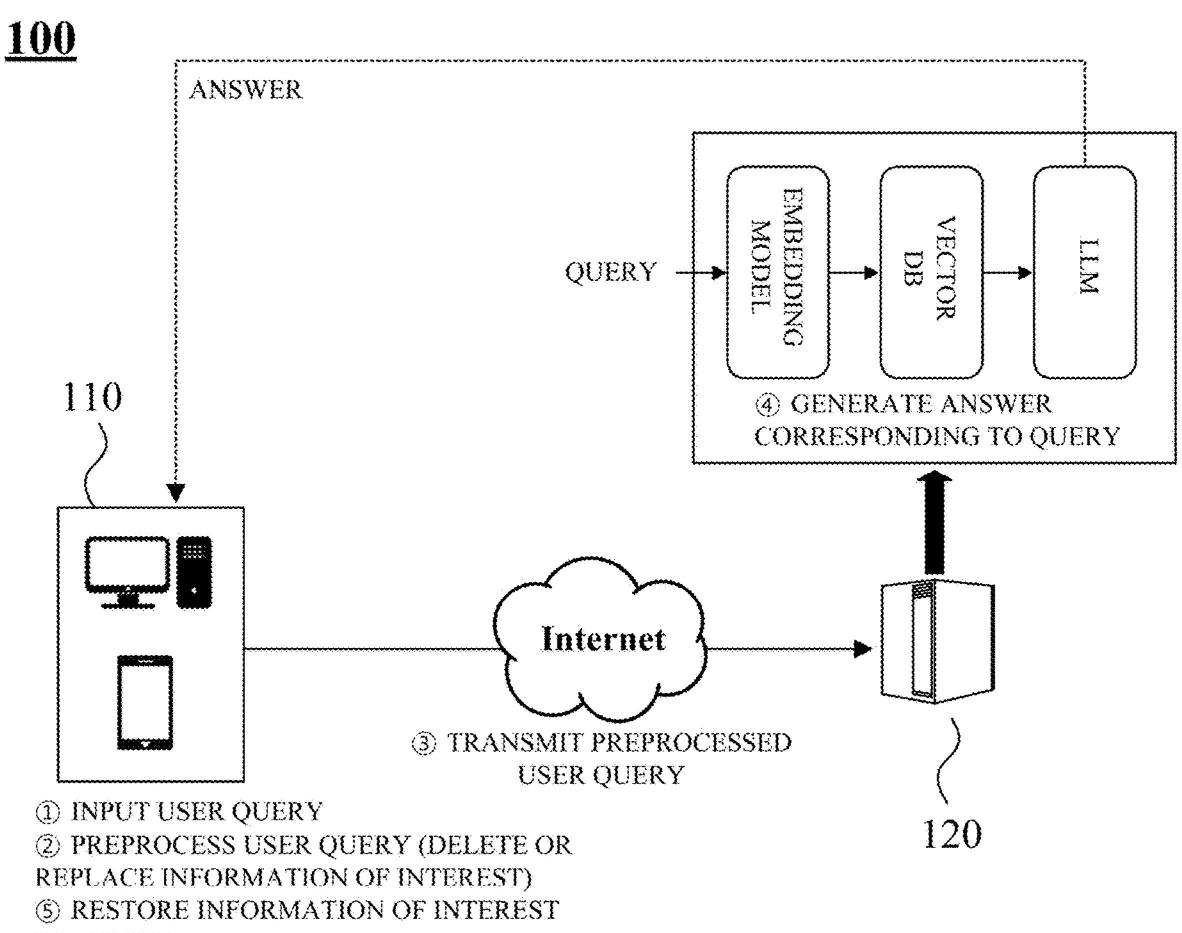
FIG. 1 is an example of a large language model (LLM) service system without exposure of information of interest.

Since the technology described below can have various changes and can have various embodiments, specific embodiments are illustrated in the drawings and described in detail. However, this is not intended to limit the technology described below to specific embodiments, and it should be understood to include all changes, equivalents, and alternatives falling within the spirit and scope of the technology described below.

The terms first, second, A, B, etc., may be used to describe various components, but the components are not limited by the terms, and are only used to distinguish one component from another. For example, without departing from the scope of the following description, a first component may be referred to as a second component, and similarly, the second component may also be referred to as a first component. The term "and/or" includes any and all combinations of one or more of the associated listed items.

As used herein, the singular forms should be understood to include the plural forms unless the context clearly indicates otherwise, and the terms "comprise," "comprising," "include," and/or "including" used herein specify the presence of stated features, integers, steps, operations, elements, components, parts or combinations thereof, and do not preclude the presence or addition of one or more other features, integers, steps, operations, elements, components, parts or combinations thereof.

As used herein, the singular forms "a," "an," and "the" are intended to include the plural forms as well, unless the context clearly indicates otherwise. Also, as used herein, the terms "comprise," "comprising," "include," and/or "including" specify the presence of listed features, elements, steps, operations, components, and/or parts, but do not preclude the presence or addition of one or more other features, elements, steps, operations, components, parts, and/or groups.

As used in the claims and in the description below, the term "at least one," "one or more of," and "one of both" are used inclusively to refer to items expressed thereafter. For example, "at least one of A, B, or C" means A, B, C, AB, AC, BC, or ABC (all A, B, and C).

Before describing the drawings in detail, it should be clarified that the division of constituent parts in this specification is merely a division by main functions of each constituent part. That is, two or more constituent parts to be described below may be combined into one constituent part, or one constituent part may be divided into two or more constituent parts for each subdivided function. In addition, each of the constituent parts described below may additionally perform some or all of the functions of other constituent parts in addition to the main function of the constituent part itself, and it goes without saying that some of the main functions performed by each of the constituent parts may be performed exclusively by other components.

Also, in performing a method or an operation method, processes constituting the method may take place differently from the stated order unless clearly specified in the context. That is, each process may occur in the same order as described, may be performed substantially simultaneously, or may be performed in reverse order.

The technology described below is a technique that may be used for hyperscale artificial intelligence (AI)-based services.

The technique described below may be applied to various AI models. For example, the AI model may be a large language model (LLM). The LLM may be implemented using various methodologies.

The technique described below provides an LLM-based service without exposure of personal information and/or sensitive information.

The concepts of personal information and sensitive information are legally different.

Personal information is information that may identify an individual through a name, a resident registration number, an image and the like of an individual. Personal information may include unique identification information, such as a resident registration number, a passport number, a driver's license number, a foreign registration number, and the like.

Sensitive information is information about ideology, beliefs, labor union or political party membership/withdrawal, political views, health, sexual life, and other information that may significantly infringe on the privacy of an information subject.

Hereinafter, information that may be exposed to a server providing an AI-based service or an AI model is referred to as information of interest. The information of interest may include at least one of personal information, sensitive information, and unique identification information.

However, personal information may be used in a broad sense to include sensitive information. In other words, personal information may be used with the same meaning as information of interest described below.

FIG. 1 is an example of an LLM service system 100 without exposure of information of interest.

A client apparatus 110 is a terminal used by an individual user. The client apparatus 110 may be any of various devices such as a smart device, a personal computer (PC), a laptop computer, a wearable device, a smart speaker, and the like. The client apparatus 110 may receive a user query in text or voice form (① input of a user query). When the user query is input in voice form, the client apparatus 110 converts the voice form into text.

The client apparatus 110 preprocesses the query input by the user on a regular basis (② preprocessing of the user query). The client apparatus 110 detects information of interest in the user query. The client apparatus 110 may delete the information of interest detected in the text of the user query or replace the information of interest with a different word. In this case, the word replacing the information of interest is a word that does not include personal information or sensitive information. Hereinafter, a word that replaces information of interest is referred to a replacement word.

The client apparatus 110 transmits the user query in which the information of interest is deleted or replaced to a service server 120 (③ transmission of the preprocessed user query). In this case, the client apparatus 110 matches and stores the information of interest and the replacement word corresponding to the information of interest.

The service server 120 receives the preprocessed user query and generates an answer corresponding to the query using an LLM (④ generation of an answer corresponding to the query). In general, the service server 120 embeds the preprocessed query using an embedding model on a regular basis. The service server 120 converts an embedding vector into a predetermined prompt using a vector database (DB) built in advance. The service server 120 inputs the prompt into the LLM to generate an answer corresponding to the query.

The client apparatus 110 receives the answer corresponding to the query from the service server 120. The client apparatus 110 replaces the replacement word in the received response text with the information of interest using the information stored in advance (⑤ restoration of the information of interest in the answer). The client apparatus 110 may output the answer with the restored information of interest.

Figure 2:
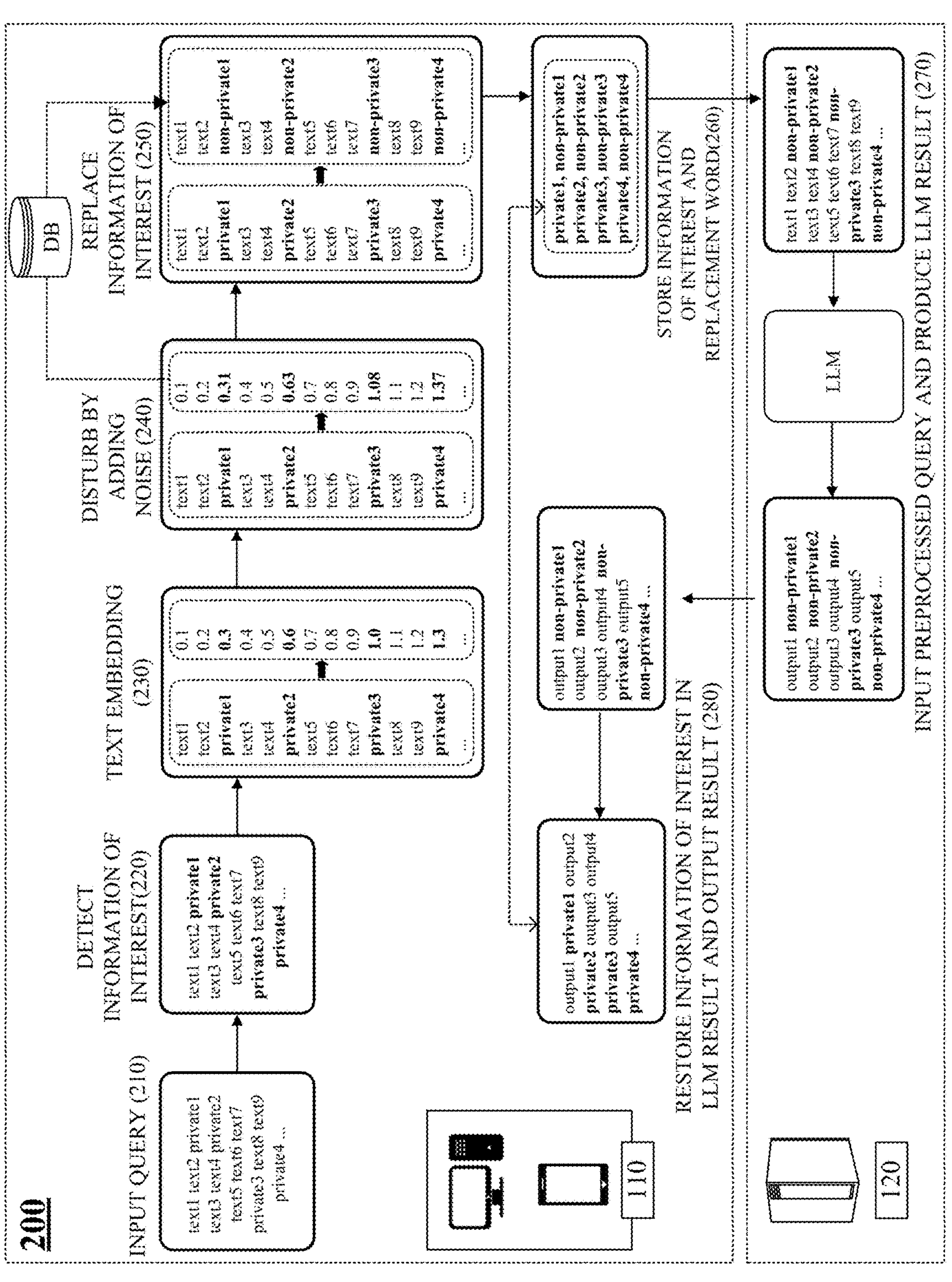
FIG. 2 is an example of a process for providing an LLM service without exposure of information of interest.

FIG. 2 is an example of a process 200 for providing an LLM service without exposure of information of interest.

The client apparatus 110 receives a user query (210). When the user query is voice data, the client apparatus 110 converts the voice data into text data. The client apparatus 110 may parse the user query into a plurality of tokens. It is assumed that the user query is composed of a plurality of tokens, such as {text1 text2 private1 text3 text4 private2 text5 text6 text7 private3 text8 text9 private4 . . . }. "Text" means a general token (word) that is not information of interest, and "private" means a token that includes personal information or sensitive information.

The client apparatus 110 detects information of interest in the user query (220). Various methods of detecting information of interest may exist.

(1) The client apparatus 110 may detect information of interest in the user query using a pre-built interest information table. The interest information table may be composed of keywords or words corresponding to information of interest. The interest information table may be updated. The client apparatus 110 may label general words and information of interest in the user query using the interest information table.

(2) The client apparatus 110 may detect information of interest in the user query using a separate natural language processing model that has been built in advance. That is, in this case, the natural language processing model corresponds to a model that classifies or labels information of interest in the input text and needs to be built in advance. The client apparatus 110 may input the user query or tokens extracted from the user query into the natural language processing model to classify or detect information of interest in the user query.

The client apparatus 110 may embed the text of the user query on a regular basis (230). The client apparatus 110 may embed each token extracted from the text on a regular basis. In this case, the text embedding may be the same technique as the embedding used for processing an input of the LLM operating in the service server 120.

The client apparatus 110 may disturb the information of interest in the user query by adding certain noise to the information of interest (noise embedding) (240). In this case, the noise may be a value determined according to a certain rule. Alternatively, the client apparatus 110 may add noise to the information of interest (a token) according to a differential privacy (DP) technique.

The client apparatus 110 may find a token or word closest to the value embedded with the noise and replace the information of interest (250). In FIG. 2, the DB may store a table in which specific text is matched with embedded values of the text. The table in which text is matched with an embedded value of the text is referred to a text embedding table. The text embedding table matches and stores a large number of words and the embedded values of the words.

The client apparatus 110 finds a token (word) closest to the value embedded with the noise in the DB and replaces the information of interest in the user query. In FIG. 2, all information of interest (private) has been replaced with replacement words (non-private).

The client apparatus 110 stores the information of interest in the user query and the replacement word that has replaced the information of interest in a table format as shown in Table 1 below (260). A table like Table 1 is referred to as a replacement word table.

TABLE 1

| No. | Information of interest | Replacement word |
|---|---|---|
| 1 | private 1 | non-private1 |
| 2 | private 2 | non-private2 |
| 3 | private 3 | non-private3 |
| 4 | private 4 | non-private4 |
| . . . | . . . | . . . |

The client apparatus 110 transmits the user query in which the information of interest is replaced with a replacement word (preprocessed) to the service server 120.

The service server 120 regularly converts the preprocessed user query into a vector and inputs the vector into the LLM, and produces an LLM result value (an answer) for the user query (270) using the LLM. The answer corresponding to the user query is composed of {output1 non-private1 output2 non-private2 output3 output4 non-private3 output5 non-private4 . . . }. The service server 120 transmits the answer for the user query to the client apparatus 110.

The client apparatus 110 detects the replacement word in the received answer. The client apparatus 110 may restore the replacement word in the answer to the corresponding information of interest using the replacement word table, and output the answer with the restored information of interest (280).

A client apparatus may receive a user query including dates, ages, identification information, and the like. For example, the client apparatus may receive a query, such as "There are 10 attendees for the meeting on September 4, including AAA (real name)." The client apparatus may detect information of interest in the query and replace the detected information of interest with a replacement word. For example, the client apparatus may preprocess the user query to, for example "There are 10 attendees for the meeting on [DATE_A], including [NAME_A]." In this case, the replacement word may be a generalized word for dates, names, and the like. The service server may receive the preprocessed query and generate a predetermined response. For example, the client apparatus may transmit a predetermined request (content summary) along with the query to the service server. In this case, the service server may generate an answer, such as "(1) Date: [DATE_A], (2) Meeting attendees: 10 people including [NAME_A]." The client apparatus may replace the replacement word in the received response with the information of interest that is known, and output the answer, such as "(1) Date: September 4, (2) Meeting attendees: 10 people including AAA."

Figure 3:
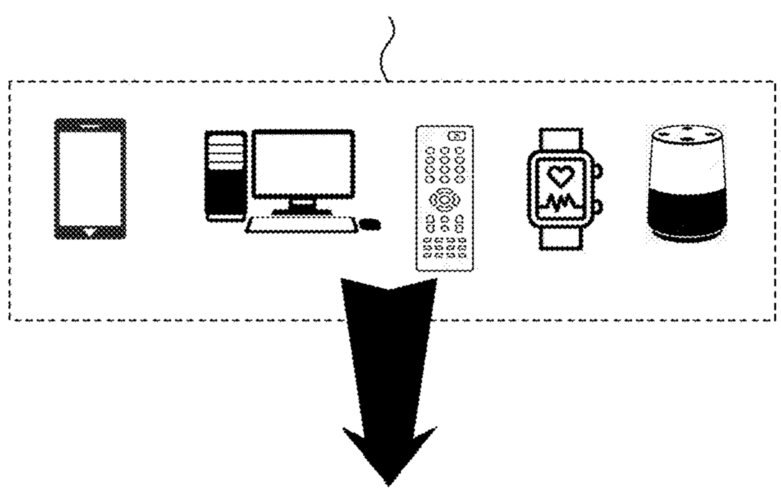
FIG. 3 is an example of a client apparatus.

FIG. 3 is an example of a client apparatus 300. The client apparatus 300 shown in FIG. 3 corresponds to the client apparatus 110 shown in FIG. 1. The client apparatus 300 is an apparatus that receives a user query, removes information of interest in the user query, transmits the user query to a service server, and restores the information of interest in an answer to the query. The client apparatus 300 may be implemented in any of various forms, such as a smart device, a person computer (PC), a wearable device, a smart speaker, or a remote controller.

The client apparatus 300 may include a storage device 310, a memory 320, a computation device 330, an interface device 340, and a communication device 350. Alternatively, the client apparatus 300 may include a storage device 310, a memory 320, an computation device 330, an interface device 340, a communication device 350, and an output device 360.

The storage device 310 may store a user query.

The storage device 310 may store a replacement word table. The replacement word table may store information of interest and replacement words matching the information of interest.

The storage device 310 may store a text embedding table. The text embedding table may match and store arbitrary words and their corresponding embedding values. The embedding value of the text embedding table may be a value of a corresponding word (a token) that includes noise. In this case, the noise may be a value according to the DP technique.

The storage device 310 may store source code or programs that control data preprocessing, detection of information of interest, replacement of information of interest, restoration of information of interest, and the like.

The memory 320 may store data generated in the process of the client apparatus 300 removing or replacing information of interest in a user query and restoring information of interest in an answer.

The interface device 340 is a device that receives certain information or data.

The interface device 340 may be a device that receives text data (a keyboard, mouse, a touch screen, etc.) or a device that receives voice input (a microphone). Alternatively, the interface device 340 may be a device that transmits information internally from an external object or a connected device.

The interface device 340 may receive a user query from an input device or an external object (an external storage device, etc.). In this case, the user query may be in the form of a file.

The interface device 340 may transmit the user query (a preprocessed user query) with replaced information of interest to an external object.

The interface device 340 may receive an answer to the user query from the external object. The communication device 350 is a configuration that receives and transmits certain information through a wired or wireless network.

The communication device 350 may receive a user query from an external object. In this case, the user query may be in the form of a file.

The communication device 350 may transmit a user query (a preprocessed user query) with replaced information of interest to an external object (a service server).

The communication device 350 may receive an answer to the user query that is determined using an LLM from the external object (a service server).

The communication device 350 may also transmit the answer in which the information of interest is restored to the external object.

Furthermore, the interface device 340 may include a configuration that transmits information or data received through the communication device 350 to the client apparatus 300.

The computation device 330 may convert a user query in the form of voice data into a text form. The text conversion may utilize a traditional voice processing technique or a deep learning-based model.

The computation device 330 may perform tokenization on a user query.

The computation device 330 may detect information of interest in a user query (tokens). The computation device 330 may detect the information of interest in the user query using the interest information table as described above or using a separate learning model built in advance for the classification of information of interest. The computation device 330 may label information of interest in the user query (tokens).

The computation device 330 may replace information of interest (a token) in the user query with a replacement word through the process described in FIG. 2.

The computation device 330 may store the information of interest in the user query and the replacement word corresponding to the information of interest in the form of a table (a replacement word table).

The computation device 330 may restore the information of interest from an answer to the query received from a service server. The computation device 330 may replace the replacement word in the answer with the corresponding information of interest using the replacement word table.

The computation device 330 may be a device, such as a processor, an application processor (AP), an arithmetic device or a chip embedded with a program that processes data and processes a certain operation.

The output device 360 may output an interface screen that receives a user query and/or an answer in which information of interest is restored.

The methods according to the embodiments described in the specification may be implemented in the form of hardware, software, or a combination of hardware and software.

When implemented in software, a computer-readable storage medium for storing one or more programs (software modules) may be provided. One or more programs stored in a computer-readable storage medium are configured for execution by one or more processors in an electronic device. The one or more programs include instructions that cause the electronic device to perform the methods according to the embodiments described in the specification.

In addition, the above-described method of providing an AI-based service may be implemented as a program (or application) including an executable algorithm that can be executed on a computer. The program may be provided by being stored in a transitory or non-transitory computer readable medium.

A non-transitory readable medium is a medium that can store data semi-permanently and can be read by a device, rather than a medium that stores data for a short period of time, such as a register, cache, or memory. Specifically, the above-described various applications or programs may be provided by being stored in a non-transitory readable medium, such as a compact disc (CD), a digital versatile disc (DVD), a hard disk, a Blu-ray disc, a Universal Serial Bus (USB), a memory card, a read-only memory (ROM), a programmable read only memory (PROM), an erasable PROM (EPROM), or an electrically erasable PROM (EEPROM), or a flash memory.

Transitory readable media refer to various RAMS, such as a static RAM (SRAM), a dynamic RAM (DRAM), a synchronous DRAM (SDRAM), a double data rate SDRAM (DDR SDRAM), an enhanced SDRAM, a synchronous DRAM (synclink DRAM, SLDRAM), and a direct rambus RAM (DRRAM).

In addition, the programs may be stored in attachable storage devices that may be accessed through communication networks, such as the Internet, an intranet, a local area network (LAN), a wide area network (WAN), or a storage area network (SAN), or a communication network composed of a combination thereof. Such a storage device may be connected to a device performing an embodiment of the present disclosure through an external port. In addition, a separate storage device on a communication network may be connected to a device performing an embodiment of the present disclosure.

The present embodiment and the attached drawings are only a part of the technical idea included in the above-described technology, and it is obvious that all modifications and specific embodiments that may be easily deduced by a person skilled in the art within the scope of the technical idea included in the specification and drawings of the above-described technology are included within the scope of the above-described technology.

The invention claimed is:

1. A method of providing an artificial intelligence (AI)-based service, the method comprising:
- receiving, by a client apparatus, a user query;
- preprocessing, by the client apparatus, the user query by replacing a target word corresponding to personal information with a corresponding replacement word;
- transmitting, by the client apparatus, the preprocessed user query to a service server for providing an AI-based service, wherein the target word corresponding to personal information is not transmitted to the service server;
- receiving, by the client apparatus, a response of the user query from the service server; and
- restoring, by the client apparatus, the target word in the response by replacing the replacement word with the corresponding target word,
- wherein the preprocessing comprises:
  - detecting the target word in the user query;
  - generating an embedding vector of the target word;
  - determining the replacement word based on the embedding vector by selecting a word having an embedding vector most similar to the embedding vector of the target word from a plurality of words stored in association with corresponding embedding vectors in an embedding space; and
  - replacing the target word with the replacement word in the user query.

2. The method of claim 1, wherein the client apparatus detects the target word in the user query using a pre-built learning model.

3. The method of claim 1, further comprising storing, by the client apparatus, the target word and the replacement word in a table,
- wherein, when the replacement word is present in the response, the client apparatus refers to the table and replaces the replacement word with the target word.

4. A client apparatus for receiving an artificial intelligence (AI)-based service, the client apparatus comprising:
- an interface device configured to receive a user query;
- a communication device configured to transmit a preprocessed user query to a service server for providing an AI-based service and receive a response corresponding to the user query from the service server;
- a storage device configured to store a plurality of words; and
- a processor configured to
  - detect, in the user query, a target word corresponding to personal information;
  - generate an embedding vector of the target word;
  - determine a replacement word based on the embedding vector by selecting, from the plurality of words stored in association with corresponding embedding vectors, a word having an embedding vector most similar to the embedding vector of the target word in an embedding space;

replace the target word in the user query with the replacement word to generate the preprocessed user query; and restore the target word by replacing the replacement word in the response received from the service server.

5. The client apparatus of claim 4, wherein the processor is configured to detect the target word in the received user query using a pre-built learning model.

6. The client apparatus of claim 4, wherein the embedding vector of the target word includes noise which is added according to a differential privacy technique.

7. The client apparatus of claim 4, wherein the storage device is configured to store the target word and the replacement word in a table, wherein the processor is configured to refer to the table and replace the replacement word with the target word when the replacement word is present in the response.

* * * * *